G. C. BENJAMIN.
SELF OILING AXLE BOX.
APPLICATION FILED DEC. 19, 1907.

899,941.

Patented Sept. 29, 1908.

Witnesses
Hugh H. Ott.
Wm J. Koorth

Inventor
George C. Benjamin.
By Victor J. Evans
Attorney

UNITED STATES PATENT OFFICE.

GEORGE C. BENJAMIN, OF BARRE, VERMONT.

SELF-OILING AXLE-BOX.

No. 899,941.     Specification of Letters Patent.     Patented Sept. 29, 1908.

Application filed December 19, 1907. Serial No. 407,176.

*To all whom it may concern:*

Be it known that I, GEORGE C. BENJAMIN, a citizen of the United States, residing at Barre, in the county of Washington and State of Vermont, have invented new and useful Improvements in Self-Oiling Axle-Boxes, of which the following is a specification.

Figure 1:
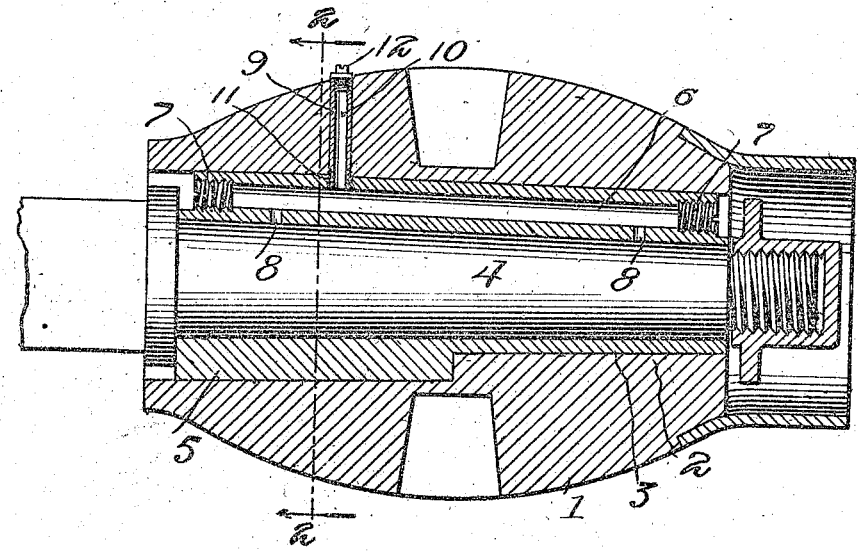
Figure 2:
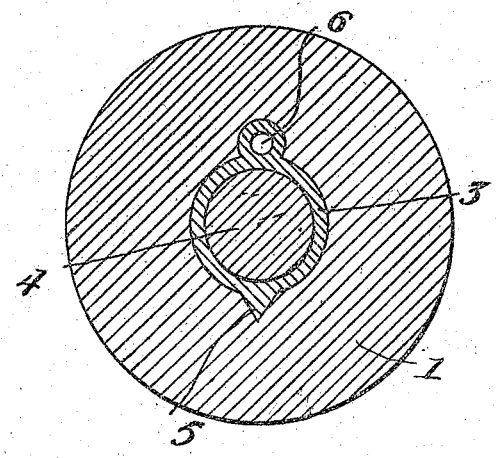

This invention relates to self oiling devices for vehicle axles, and the object of the invention is to provide a device constructed upon the ordinary axle box of a vehicle hub whereby a continuous feed of lubricant is imparted to the axle upon its revolutions.
To these ends the invention resides in the novel construction of axle boxes provided with a lubricant containing chamber and applicable to the vehicle hubs of ordinary construction.
In the drawings, Figure 1 is a longitudinal sectional view of a vehicle hub provided with my improvement, and Fig. 2 is a longitudinal sectional view of the same upon the line 2—2 and looking in the direction of the arrows.
In the accompanying drawings the numeral 1 designates a vehicle hub of the ordinary construction, and provided with the usual central longitudinal bore 2 for the reception of the axle box.
The improved axle boxing, forming the subject matter of the present application, comprises the usual hollow casting 3, cylindrical in cross section and adapted for the reception of the vehicle axle 4. The boxing 3 is provided upon its lower ends with a V-shaped flange 5, adapted to secure it from rotation within the hub 1, and upon its upper face with the longitudinally extending oil chamber 6. This oil chamber 6 is preferably of a lesser length than the main body of the axle box 3 and is preferably provided upon each of its ends with suitable screw threads adapted for the reception of threaded plugs 7, by which the channel is effectively closed, and the lower wall of the chamber provided by the axle box 3 is provided with a series of perforations 8, by which the lubricant contained within the chamber is imparted to the axle 4. The hub 1 directly above the chamber 6 is provided with a bore or passage 9 adapted for the reception of a cylinder 10 threadedly engaged with the chamber as at 11 and having its upper end threaded for the reception of a closing plug 12. With this construction it will be seen that lubricant being fed through the cylinder 10 into the chamber 6 is retained in said chamber and imparted to the axle 4 through the perforations 8 upon the revolution of the wheel. By this construction it will be noted that the lubricant is retained within the chamber 6 until the wheel revolves, and that the lubricant within the chamber is entirely protected from dust or dirt by the plugs arranged upon the chamber and in the entrance channel to the chamber.

Having thus fully described the invention what is claimed as new is:

The combination with an axle hub having a central bore running longitudinally of the hub and having a passage communicating with the bore and a depression also communicating with the bore, and being provided with a vertical opening communicating with the bore, of an axle boxing having a chamber formed thereon and an enlargement upon its face directly opposite the chamber, the axle boxing adapted to be received within the bore of the hub, the chamber being positioned within the passage of the hub and the enlargement occupying the depression of the hub, closures for each end of the chamber, the lower wall of the chamber provided with openings communicating with the hub, a cylinder within the vertical opening of the hub and communicating with the chamber, and a closure for the cylinder.

In testimony whereof I affix my signature in presence of two witnesses.

GEORGE C. BENJAMIN.

Witnesses:
 BERT SMITH,
 BENJAMIN GATES.